United States Patent [19]

Saeki et al.

[11] Patent Number: 5,121,279
[45] Date of Patent: Jun. 9, 1992

[54] MAGNETIC DISK CARTRIDGE WRITE/PROTECT ASSEMBLY HAVING IMPACT AVOIDING PORTIONS

[75] Inventors: Tetsuo Saeki; Hidetoshi Watanabe, both of Ichigai, Japan

[73] Assignee: Kao Corporation, Tokyo, Japan

[21] Appl. No.: 563,623

[22] Filed: Aug. 7, 1990

[30] Foreign Application Priority Data

Aug. 10, 1989 [JP] Japan .................................. 1-94274

[51] Int. Cl.$^5$ ..................... G11B 23/03; G11B 19/04; G11B 15/04
[52] U.S. Cl. ..................... 360/133; 360/60; 360/132; 360/134
[58] Field of Search ............... 360/60, 133, 132, 137, 360/134

[56] References Cited

U.S. PATENT DOCUMENTS

| | | | |
|---|---|---|---|
| 4,536,812 | 8/1985 | Oishi et al. ................. | 360/60 X |
| 4,685,017 | 8/1987 | Swinburne et al. ............ | 360/133 |
| 4,796,138 | 1/1989 | Ono ......................... | 360/133 |
| 4,805,061 | 2/1989 | Champagne et al. ........... | 360/60 X |

*Primary Examiner*—John H. Wolff
*Attorney, Agent, or Firm*—Birch, Stewart, Kolasch & Birch

[57] ABSTRACT

A magnetic disk cartridge includes a write/protect tab adapted to prevent erasure of information recorded in a magnetic disk inserted in a case, and a peripheral wall defined in inner surfaces of corner portions of a pair of case members consisting of a case bottom member and a case cover member, for slidably receiving said write/-protect tab therein;

said write/protect tab being provided with a pair of arm portions extending along both sides of a body portion thereof, each of said arm portions being provided with an outwardly projecting portion formed on a tip thereof;

the peripheral wall formed on said case bottom member being provided with two pairs of receiving projecting portions formed on opposite side wall portions in a sliding direction of said write/protect tab and adapted to receive end portions of said one pair of projecting portions, each of said side wall portions being provided with a wall surface formed between said two receiving projecting portions and curved in the reversal direction relative to the projecting direction of said two receiving projecting portions; and when said write/protect tab is slid, said one pair of projecting portions of said write/protect tab being brought into engagement with corresponding said two pairs of receiving projecting portions to thereby receive said write/protect tab, and each of said projecting portions of said pair of arms of said write/protect tab is provided with an impact avoiding portion adpted to avoid impact caused by abutment between said projecting portion and an abutment surface of the side wall portion of said case cover member which is to be abutted against the side wall portion forming the curved wall surface of said case bottom member.

6 Claims, 7 Drawing Sheets

1

MAGNETIC DISK CARTRIDGE WRITE/PROTECT ASSEMBLY HAVING IMPACT AVOIDING PORTIONS

BACKGROUND OF THE INVENTION

1. Field of the Invention

This invention relates to a magnetic disk cartridge and more particularly to a structure of a write/protect tab.

2. Description of the Prior Art

An inadvertent erasure prevention tab (hereinafter referred to as a write/protect tab) of a conventional magnetic disk cartridge is slidably disposed at one corner portion in a case and intended to prevent inadvertent eraser of the information on the disk.

An inadvertent erasure prevention mechanism of the conventional magnetic disk cartridge will be described with reference to FIGS. 17 through 23.

The conventional disk cartridge comprises a case 1 and comprises a magnetic disk (not shown) inserted in the case 1. The case 1, as shown in FIG. 17, a pair of case members, i.e., a cover case 2a and a bottom case 2b assembled together. Each of the case members 2a and 2b is provided with a generally C-shaped liner 3, 3 adhered to the inner surface thereof. The inner surfaces of the case members 2a and 2b are also provided with rectangular windows 21, 21 formed between end portions of the liners 3, 3 and adapted to allow a magnetic head (not shown) access to the magnetic disk to record information thereon or reproduce information recorded thereon through the windows 21, 21. Also, one corner portion of the case members 2a and 2b is provided with rectangular peripheral walls 22, 22 which, when the case members 2a and 2b are assembled together, form a tab pocket, as shown in FIGS. 18 through 20, for slidably receiving therein a write/protect tab 4 as shown in FIG. 21.

The write/protect tab 4, as shown in FIG. 21, comprises a body portion 4A, and a pair of arm portions 4B, 4B extending along both sides of the body portion 4A and terminating in projecting portions 4C, 4C projecting outwardly from outer ends of the arm portions 4B, 4B. Most of the arm portions 4B, 4B are formed such that they are gradually dilated outwardly. And owing to rounded projecting portions 22B, 22B, (which will be described afterwards), the projecting portions 4C, 4C at the tips of the arm portions 4B, 4B are more securely encaptured.

Either of the case members 2a, 2b, e.g., bottom case member 2a is provided with two pairs of rounded projecting portions 22B, 22B formed on the opposite inner side wall portions in the rectangular peripheral walls 22 of the case bottom member 2a, i.e., a pair of side wall portions 22 (see FIG. 18) along a sliding direction of the write/protect tab 4 and adapted to receive end portions of the corresponding projecting portions 4C, 4C of the pair of arm portions 4B, 4B. And a pair of curved wall surfaces 22C, 22C are provided between the rounded projecting portions. The write/protect tab 4 is slidably mounted in the tab pocket, as shown in FIG. 18, which is formed by a combination of the corresponding peripheral walls 22, 22 of the case bottom member 2a and case cover member 2b. The pair of projecting portions 4C, 4C are received by the corresponding rounded projecting portions 22B, 22B of the side wall portions 22A, 22A. The thickness of each write/protect tab 4 is greater than the height of each side wall portion 22 as shown in FIG. 22. The tab 4 is received by either of the retaining projecting portions 22B, 22B, to thereby fix the body portion 4A to a closing position (see FIG. 19) or an opening position (see FIG. 20) for an opening 23 (shown in FIG. 18) formed in the peripheral wall 22 of the case cover member 2. As shown in FIG. 20, when the body portion 4A is in the position for opening the opening 23, the tab 4 acts to prevent inadvertent eraser. The numeral 24 denotes a guide opening formed in the peripheral wall of the case bottom member 2 and adapted to guide the inadvertent eraser prevention tab 4 in the tab pocket.

When the magnetic disk cartridge is assembled, the projecting portions 4C, 4C are usually placed between the rounded projecting portions 22B, 22B (see FIG. 18).

However, in the conventional magnetic disk cartridge, as the write/protect tab 4 is formed greater in thickness than the height of the peripheral wall 22 of the case bottom member 2a and the projecting portions 4C, 4C are formed flat, they project upward from the side wall portions 22A, 22A in the curved wall surfaces 22C, 22C. As a consequence, when the case cover member 2b is placed upon the case bottom member 2a with the write/protect tab 4 sandwiched therebetween, the tips of the projecting portions 4C, 4C are brought into contact relation with the peripheral walls 22, 22 of the case cover member 2b as shown in FIG. 23. This contact occurs frequently in a disk cartridge in which the arm portions 4B, 4B are extended in such a manner as to be gradually dilated outwardly. However, even for a disk cartridge in which the arm portions 4B, 4B are extended not in such a fashion as discussed above, in other words, the arm portions 4b, 4b are extended substantially parallel relation, the write/protect tab 4 tends to move in the peripheral wall 22 and the projecting portions 4C, 4C are possibly frequently contacted with side wall portions. If the case cover member 2b is placed on the case bottom member 2a in that state, the contacting portions are chipped and fine powder resulting from such chipping tends to enter into the case, thus possibly resulting in error such as dropout during recording and reproducing operation.

SUMMARY OF THE INVENTION

It is therefore an object of the present invention to provide a magnetic disk cartridge which is capable of preventing possible chipping caused by contact between projecting portions of a write/protect tab and the peripheral walls of case members and also preventing generation of fine powder resulting therefrom.

According to the present invention, the above object can be achieved by the following magnetic disk cartridge.

In a magnetic disk cartridge including a write/ protect tab adapted to prevent erasure of information recorded in a magnetic disk inserted in a case, and a peripheral wall defined in inner surfaces of corner portions of a pair of case members consisting of a case bottom member and a case cover member, for slidably receiving said write/protect tab therein;

said write/protect tab being provided with a pair of arm portions extending along both sides of a body portion thereof, each of said arm portions being provided with an outwardly projecting portion formed on a tip thereof;

the peripheral wall formed on said case bottom member being provided with two pairs of receiving projecting portions formed on opposite side wall portions in a sliding direction of said write/protect tab and adapted to receive end portions of said one pair of projecting portions, each of said side wall portions being provided with a wall surface formed between said two receiving projecting portions and curved in the reversal direction relative to the projecting direction of said two receiving projecting portions; and when said write/protect tab is slid, said one pair of projecting portions of said write/protect tab being brought into engagement with corresponding said two pairs of receiving projecting portions to thereby receive said write/protect tab;

said magnetic disk cartridge being characterized in that each of said projecting portions of said pair of arms of said write/protect tab is provided with an impact avoiding portion adapted to avoid impact caused by abutment between said projecting portion and an abutment surface of the side wall portion of said case cover member which is to be abutted against the side wall portion forming the curved wall surface of said case bottom member.

The above object can also be achieved by the following magnetic disk cartridge.

In the above-mentioned magnetic disk cartridge;

said magnetic disk cartridge being characterized in that an abutment surface of the side wall portion of said case cover member abutting against the side wall portion forming the curved wall surface of said case bottom member is provided with an impact avoiding portion for avoiding impact caused by abutment between said abutment surface and the projecting portions of said one pair of arm portions of said write/protect tab.

The impact avoiding portion may take various constructions such as a rounded construction, a tapered construction, a stepped construction, etc.

According to the magnetic disk cartridge of the present invention, when the magnetic disk cartridge is assembled, if the case cover member is placed on the case bottom member and pressed after the write/protect tab is set in the peripheral wall of the case bottom member, the case cover member is assembled together with the case bottom member while avoiding impact of the peripheral wall of the case cover member with respect to the projecting portions of the write/protect tab.

BRIEF DESCRIPTION OF THE DRAWINGS

FIG. 1 is a perspective view showing a write/protect tab thereof and FIG. 2 is a sectional view, when looked from line X—X of FIG. 18, of a curved wall surface forming portion showing the write/protect tab is rested therein. FIGS. 3 and 4 are views corresponding to FIGS. 1 and 2, respectively showing a magnetic disk cartridge according to the second embodiment; FIGS. 5 and 6 are views corresponding to FIGS. 1 and 2, respectively showing a magnetic disk cartridge according to the third embodiment; FIGS. 7 and 8 are views corresponding to FIGS. 1 and 2, respectively showing a magnetic disk cartridge according to the fourth embodiment; FIGS. 9 and 10 are views, corresponding to FIGS. 1 and 2, respectively showing a magnetic disk cartridge according to the fifth embodiment; FIGS. 11 and 12 are views corresponding to FIGS. 1 and 2, respectively showing a magnetic disk cartridge of the sixth embodiment. FIG. 13 is a sectional view showing a state for mounting the write/protect tab of the magnetic disk cartridge according to the seventh embodiment; FIG. 14 is a sectional view of an important portion showing the peripheral wall of the case cover member according to the eighth embodiment; FIG. 15 is a view corresponding to FIG. 13, showing the magnetic disk cartridge according to the ninth embodiment; and FIG. 16 is a view corresponding to FIG. 14, showing a magnetic disk cartridge according to the tenth embodiment of the present invention. FIG. 17 is a development view showing the inner surface of a pair of case members; FIG. 18 is a development view showing the vicinity of a pocket for receiving the write/protect tab among those of FIG. 17; FIG. 19 is a view corresponding to FIG. 18, wherein the write/protect tab is in position where the write/protect tab is unable to prevent inadvertent erasure; FIG. 20 is a view corresponding to FIG. 18, wherein the write/protect tab is in position for enabling to prevent inadvertent erasure; FIG. 21 is a perspective view showing the conventional write/protect tab; FIG. 22 is a sectional view showing the conventional write/protect tab mounted in a tab pocket; and FIG. 23 is a sectional view of the conventional write/protect tab mounted in the tab pocket with projecting portions thereof placed in a curved wall surface of the tab pocket, before assembling a pair of case members.

DETAILED DESCRIPTION OF THE PREFERRED EMBODIMENT

Figure 1:
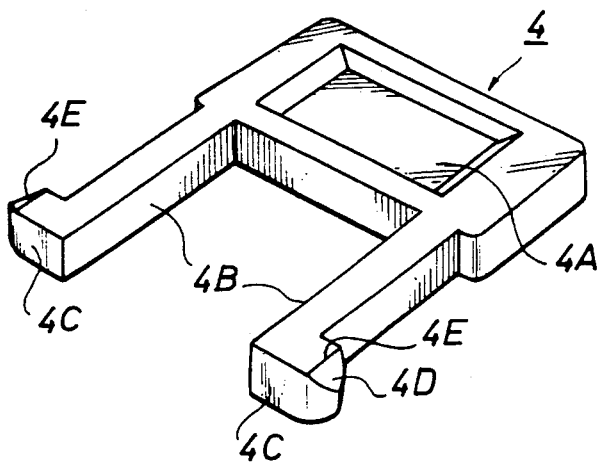
FIGS. 1 and 2 are illustrations showing an important portion of a magnetic disk cartridge according to the first embodiment of the present invention.

With reference to the embodiments depicted in FIGS. 1, and 2 through 16 wherein component parts identical with or similar to those of the conventional magnetic disk cartridge are represented by identical reference numerals, and also with reference to FIGS. 17 through 23, the present invention will now be descried.

Figure 2:
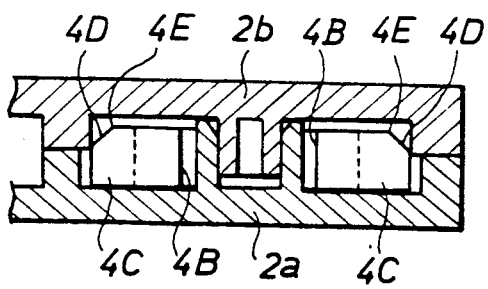

A magnetic disk cartridge according to the first embodiment of the present invention having an important portion shown in FIGS. 1 and 2 is almost the same in construction with the exception being the write/protect tab 4.

The write/protect tab 4 is comprised of impact avoiding portions (inclined surfaces 4D, 4D) formed on projecting portions 4C, 4C of a pair of arm portions 4B, 4B extending along both sides of a body portion 4A thereof and adapted to avoid impact occurrable when the projecting portions 4C, 4C are abutted against an abutment surface of a peripheral wall 22 of a case cover member 2b.

That is, the projecting portions 4C, 4C projecting outwardly from the tips of the arm portions 4B, 4B of the write/protect tab 4 are provided with inclined surfaces 4D, 4D as the above-mentioned impact avoiding portions which are, as shown in FIGS. 1 and 2, formed on surfaces (upper surfaces) thereof to be abutted against the peripheral surface 22 of the case cover member 2b and inclined downwardly from the inner side to the outer side thereof. The inclined surfaces 4D, 4D are designed such that inclination starting ends 4E, 4E thereof are placed inward of the inner edges of side wall portions 22A, 22A disposed along a sliding direction of the write/protect tab 4. Therefore, according to this embodiment, when the case cover member 2b is placed on the tab 4 with its projecting portions 4C, 4C rested in a pair of curved wall surfaces 22C, 22C of a case body member 2a (see FIG. 18) and then the case cover member 2b is placed thereon, the projecting portions 4C, 4C hardly contact with the side wall portions 22A, 22A because the inner edges of the side wall portions 22A, 22A are brought into abutment with the inclined surfaces (impact avoiding portions) of the projecting portions 4C, 4C as shown in FIG. 2. As a result, impact occurrable when the projecting portions 4C, 4C and the side wall portions 22A, 22A are contacted with each other is eased and there is no fear of chipping to both 4C and 22, and thus there is no fear of fine power production from such chipping.

Also, a magnetic disk cartridge according to the second to sixth embodiments of the present invention is the same in construction as the first embodiment except that the shapes of the projecting portions 4C, 4C of the write/protect tab 4 are different.

Figure 3:
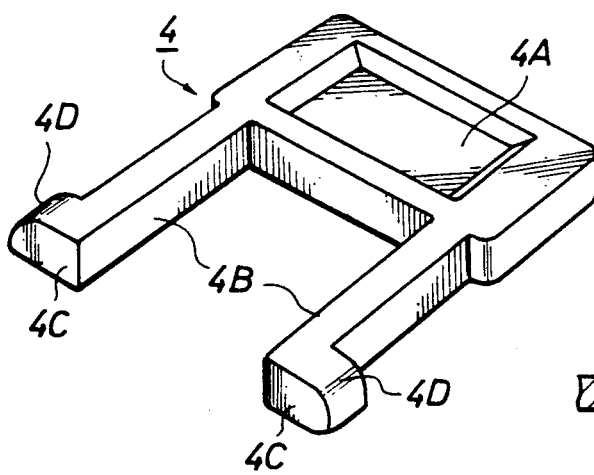
FIGS. 3 through 16 are illustrations showing important portions of second to tenth embodiments of the present invention.
Figure 4:
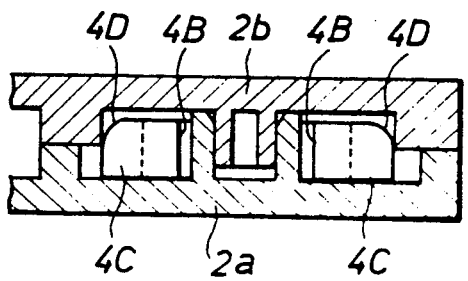

That is, the projecting portions 4C, 4C of the write/protect tab 4 are provided with arcuate surfaces 4D, 4D as the above-mentioned impact avoiding portions formed on the tips of the upper surfaces thereof as shown in FIGS. 3 and 4. Accordingly, also in the magnetic disk cartridge of this embodiment, there can be expected the same functions and effects as those of the magnetic disk cartridge of the first embodiment.

Figure 5:
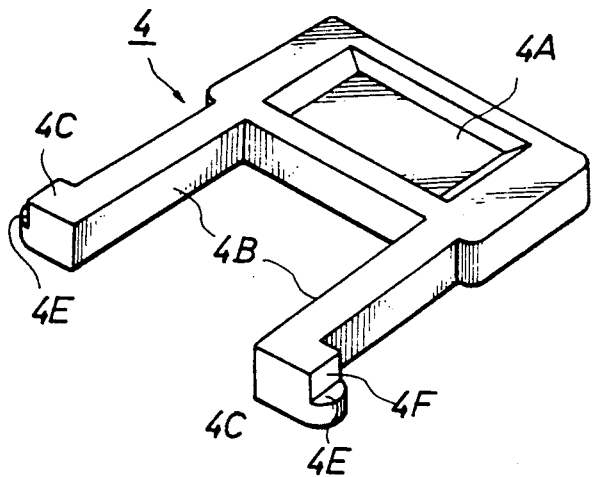
Figure 6:
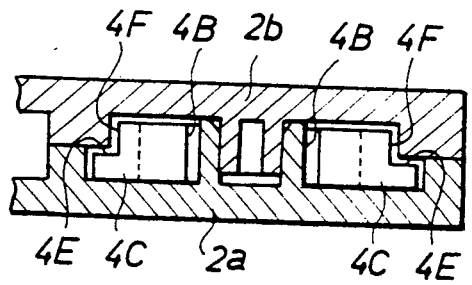

The projecting portions 4C, 4C of the write/protect tab 4 in the third embodiment of the present invention, as shown in FIGS. 5 and 6, are provided with step portions 4E, 4E as the impact avoiding portions which are formed by cutting away the upper half portions of the tip portions, and vertical surfaces 4F, 4F formed on the step portions 4E, 4E in such a manner as not to contact with the inner edges of the side wall portions 22A, 22A of the case cover member 2b. Therefore, according to this embodiment, when the case cover member 2b is placed on the case bottom member 2a after the projecting portions 4C, 4C are mounted in a pair of curved wall surfaces 22C, 22C, the inner edges of the side wall portions 22A, 22A of the case cover member 2b are not touched with the projecting portions 4C, 4C. As a result, since impact caused by contact between the inner edges of the side wall portions 22A, 22A and the projecting portions 4C, 4C can be avoided, they can be smoothly assembled and there is no fear of fine power production.

Figure 7:
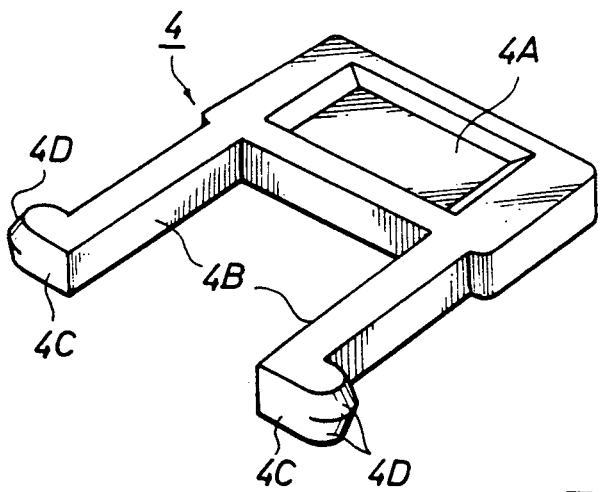
Figure 8:
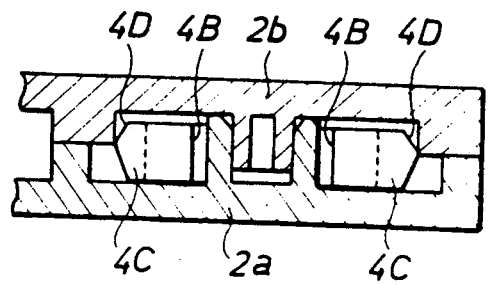

The projecting portions 4C, 4C of the write/protect tab 4 according to the fourth embodiment of the present invention, as shown in FIGS. 7 and 8, are provided at upper and lower surfaces of the tips with inclined surfaces 4D, 4D as the impact avoiding portions which are curved along the arcuate configurations of the tips. Also in this embodiment, there can be expected the same function and effect as in the first and second embodiments.

Figure 9:
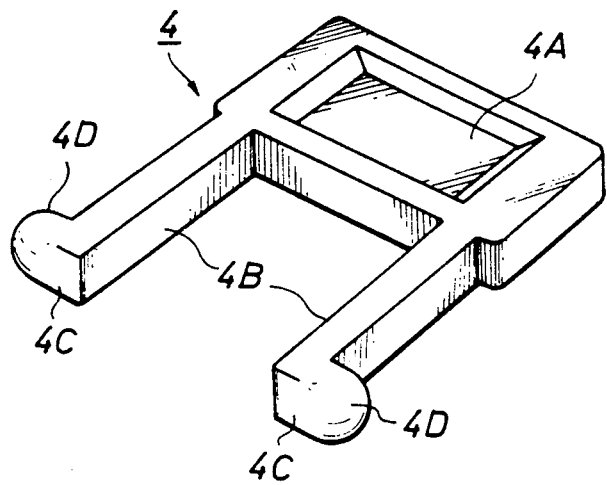
Figure 10:
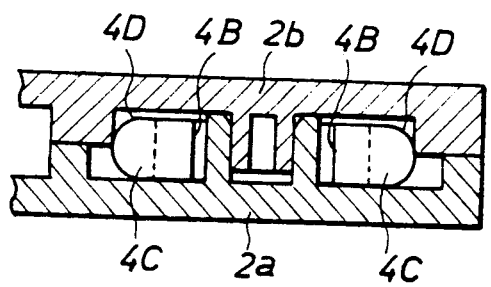

The projecting portions 4C, 4C of the write/protect tab 4 in the fifth embodiment of the present invention, as shown in FIGS. 9 and 10, are provided at tips thereof with semi-spherical surfaces 4D, 4D serving as the impact avoiding portions. Also in the magnetic disk cartridge of this embodiment, there can be expected the same function and effect as in the first, second and fourth embodiments.

Figure 11:
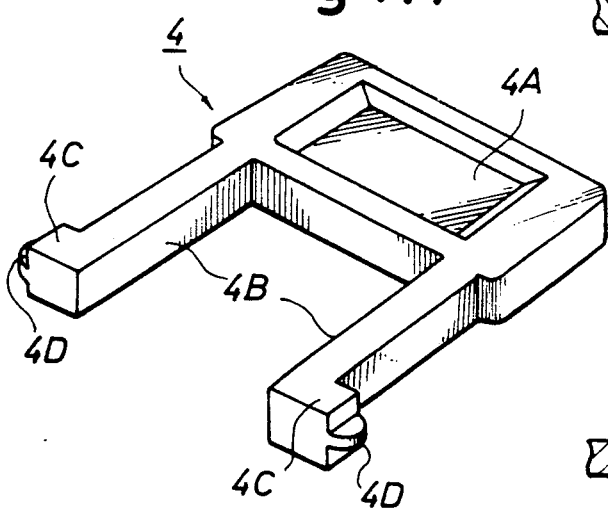
Figure 12:
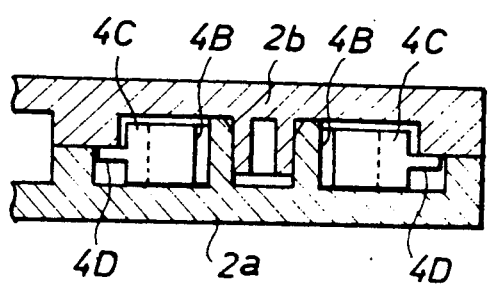

The projecting portions 4C, 4C of the write/protect tab 4 in the sixth embodiment of the present invention, as shown in FIGS. 11 and 12, are provided with flange portions 4D, 4D formed at the centers of tips thereof in the horizontal direction and serving as the impact avoiding members. The flange portions 4D, 4D are formed in such position as that they contacted with only the curved wall surfaces 22C, 22C and not contacted with inner edges of the side wall portions 22A, 22A of the case cover member 2b. According to this embodiment, there can be expected the same function and effect as in the third embodiment.

A magnetic disk cartridge according to the seventh to tenth embodiments of the present invention is identical in construction as the conventional magnetic disk except that an abutment surface of the peripheral wall 22 of the case cover member 2b which is to be abutted against abutment surfaces of the side wall portions 22A, 22A forming the curved wall surfaces 22C, 22C of the case bottom member 2a is provided with an impact avoiding portion adapted to avoid impact caused by touching with the projecting portions 4C, 4C of the write/protect tab 4.

Figure 13:
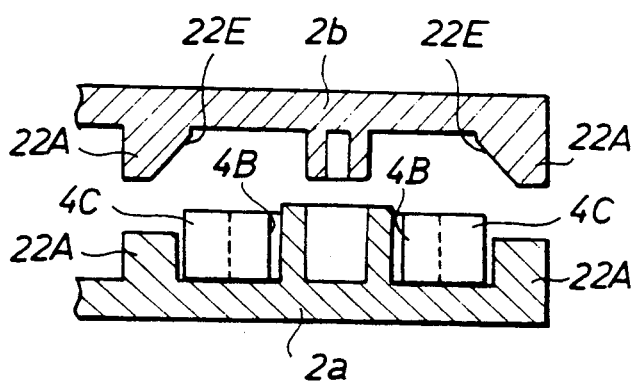

That is, the magnetic disk cartridge of the seventh embodiment, as shown in FIG. 13, is provided with inclined surfaces 22E, 22E formed on the inner sides of the opposite side wall portions 22A, 22A of the case bottom member 2b and serving as the impact avoiding portions. According to this embodiment, since the inclined surfaces 22E, 22E are brought into abutment with the tips of the projecting portions 4C, 4C of the write/protect tab 4 when the case cover member 2b is assembled with the case bottom member 2a with the write/protect tab 4 contained therein, the inclined surfaces 22E, 22E serve as the impact avoiding portions. As a result, there can be obtained the same effect as in the first, second, fourth and fifth embodiments.

Figure 14:
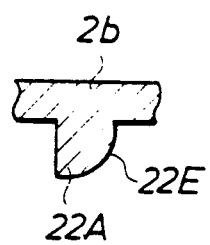

Also, a magnetic disk cartridge according to the eighth embodiment of the present invention, as shown in FIG. 14, is provided with arcuate surfaces 22E, 22E instead of the inclined surfaces 22E, 22E in the seventh embodiment, which are formed at the inner sides of the opposite side walls 22A, 22A of the case cover member 2b. Owing to the foregoing arrangement, there can be expected the same function and effect in this embodiment as in the seventh embodiment.

Figure 15:
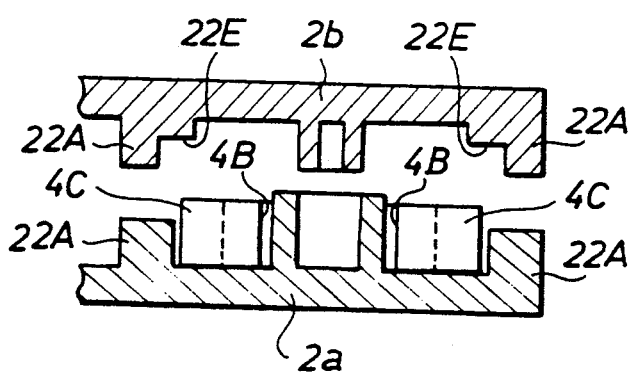

A magnetic disk cartridge according to the ninth embodiment of the present invention, as shown in FIG. 15, is provided with step portions 22E, 22E formed at the inner sides of the side wall portions 22A, 22A of the case cover member 2b and adapted to serve as the impact avoiding portions. According to this embodiment, as the step portions 22E, 22E are not contacted with the projecting portions 4C, 4C of the write/protect tab 4, they are not chipped and there is no fear of fine power production.

Figure 16:
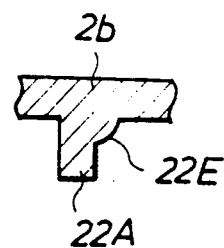
Figure 17:
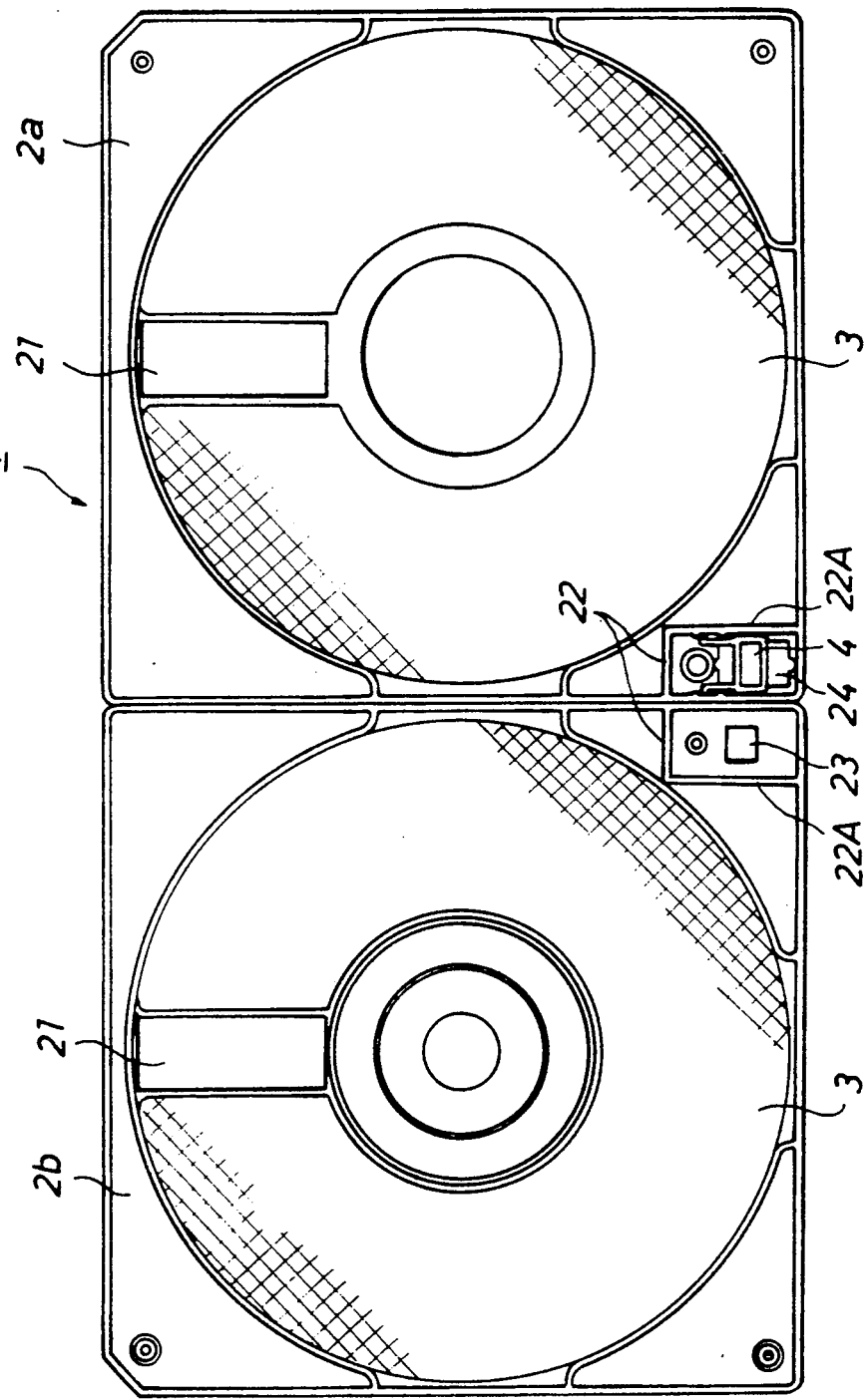
FIGS. 17 through 23 are illustrations showing the conventional magnetic disk cartridge.
Figure 18:
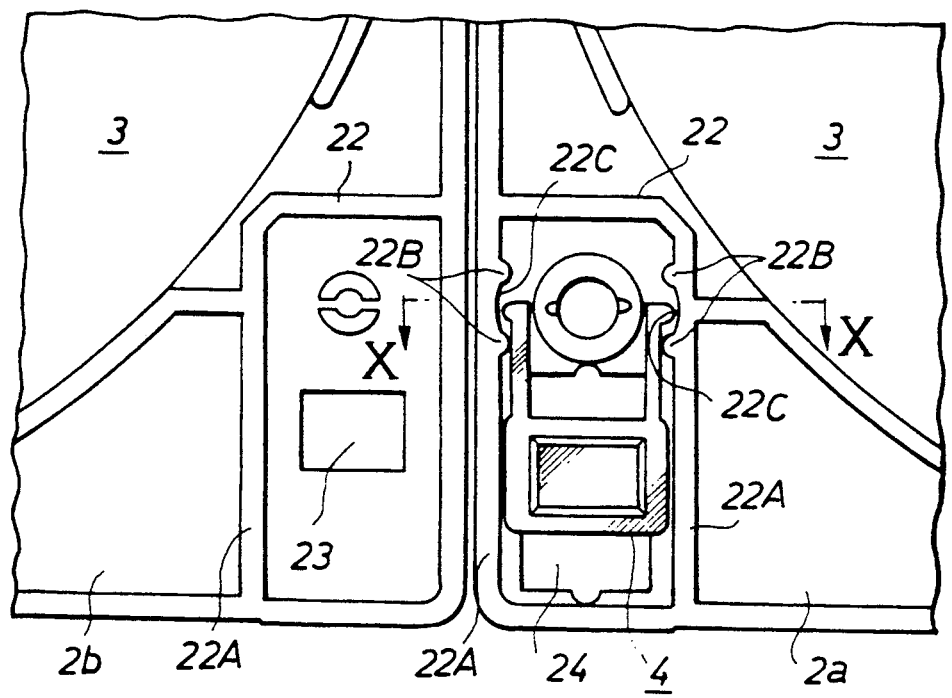
Figure 19:
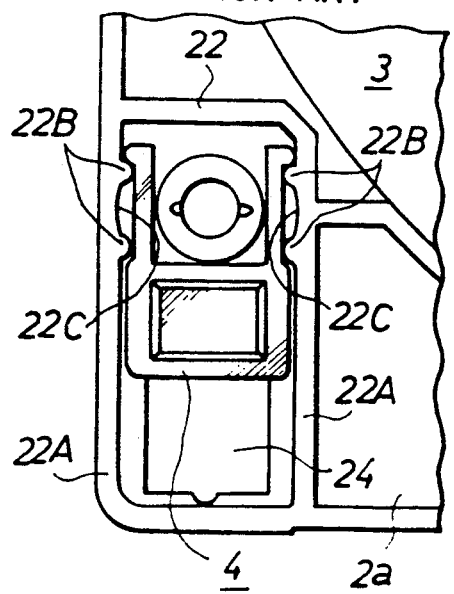
Figure 20:
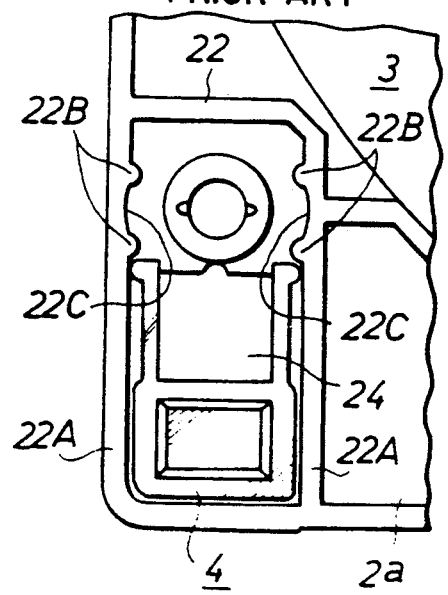
Figure 21:
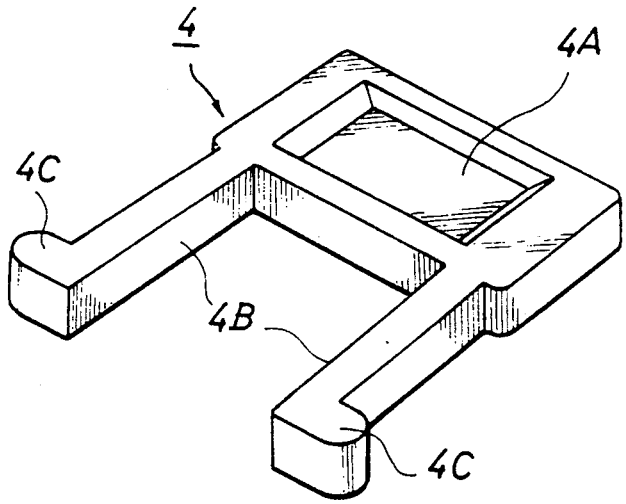
Figure 22:
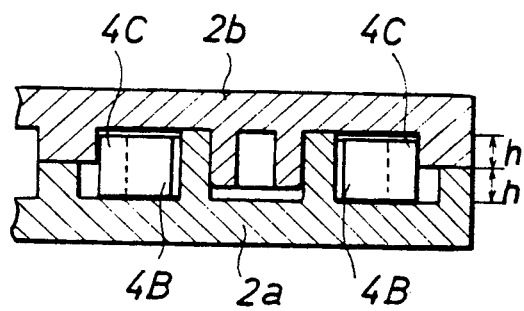
Figure 23:
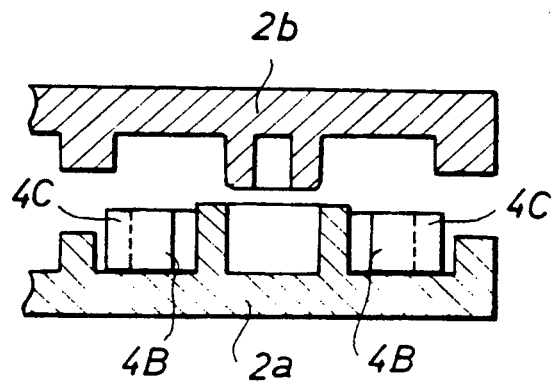

Also, the tenth embodiment of the present invention, as shown in FIG. 16, is provided with the step portions 22E, 22E of the ninth embodiment which are formed in arcuate surfaces 22E, 22E. As a result, there can be expected the same function and effect as in the ninth embodiment.

The present invention has been described with reference to various embodiments. However, the invention is of course not limited to those embodiments. Many changes and modifications can be resorted as long as they are designed such that the projecting portions 4C, 4C of the write/protect tab 4 or the side wall portions 22A, 22A of the case cover member 26 are not chipped.

What is claimed is:

1. In a magnetic disk cartridge including a write/protect tab adapted to prevent erasure of information recorded in a magnetic disk inserted in a case, and a peripheral wall defined in inner surfaces of corner portions of a pair of case members consisting of a case bottom member and a case cover member, for slidably receiving said write/protect tab therein;

said write/protect tab being provided with a pair of arm portions extending along both sides of a body portion thereof, each of said arm portions being provided with an outwardly projecting portion formed on a tip thereof, each said outwardly projecting portion having an end portion;

the peripheral wall formed on said case bottom member being provided with two pairs of receiving projecting portions formed on opposite side wall portions in a sliding direction of said write/protect tab and adapted to receive said end portions of said pair of outwardly projecting portions, each of said side wall portions being provided with a wall surface formed between said two receiving projecting portions and curved in the reversal direction relative to the projecting direction of said two receiving projecting portions; and when said write/protect tab is slid, said pair of outwardly projecting portions of said write/protect tab being brought into engagement with corresponding said two pairs of receiving projecting portions to thereby receive said write/protect tab;

said magnetic disk cartridge being characterized in that said end portion of each of said outwardly projecting portions of said pair of arms of said write/protect tab is provided with an impact avoiding portion adapted to avoid impact caused by abutment between said outwardly projecting portion and an abutment surface of the side wall portion of said case cover member which is to be abutted against the side wall portion forming the curved wall surface of said case bottom member.

2. The magnetic disk cartridge as claimed in claim 1, wherein said impact avoiding portion is selected from a group consisting of an inclined surface, an arcuate surface, a spherical surface, or a flange portion.

3. In a magnetic disk cartridge as claimed in claim 2, wherein each said impact avoiding portion is disposed facing said case cover member.

4. In the magnetic disk cartridge as claimed in claim 3, wherein each said impact avoiding portion is disposed correspondingly adjacent one of the curved wall surfaces.

5. In a magnetic disk cartridge as claimed in claim 1, wherein each said impact avoiding portion is disposed facing said case cover member.

6. In a magnetic disk cartridge including a write/protect tab adapted to prevent erasure of information recorded in a magnetic disk inserted in a case, and a peripheral wall defined in inner surfaces of corner portions of a pair of case members consisting of a case bottom member and a case cover member, for slidably receiving said write/protect tab therein;

said write/protect tab being provided with a pair of arm portions extending along both sides of a body portion thereof, each of said arm portions being provided with an outwardly projecting portion formed on a tip thereof, each said outwardly projecting portion having an end portion;

the peripheral wall formed on said case bottom member being provided with two pairs of retaining projecting portions formed on opposite side wall portions in a sliding direction of said write/protect tab and adapted to receive said end portions of said pair of outwardly projecting portions, each of said side wall portions being provided with a wall surface formed between said two receiving projecting portions and curved in the reversal direction relative to the projecting direction of said two receiving projecting portions; and when said write/protect tab is slid, said pair of outwardly projecting portions of said write/protect tab being brought into engagement with corresponding said two pairs of receiving projecting portions to thereby receive said write/protect tab;

said magnetic disk cartridge being characterized in that an abutment surface of the side wall portion of said case cover member abutting against the side wall portion forming the curved wall surface of said case bottom member is provided with an impact avoiding portion for avoiding impact caused by abutment between said abutment surface and the outwardly projecting portions of said pair of arm portions of said write/protect tab.

* * * * *